Patented Sept. 1, 1931

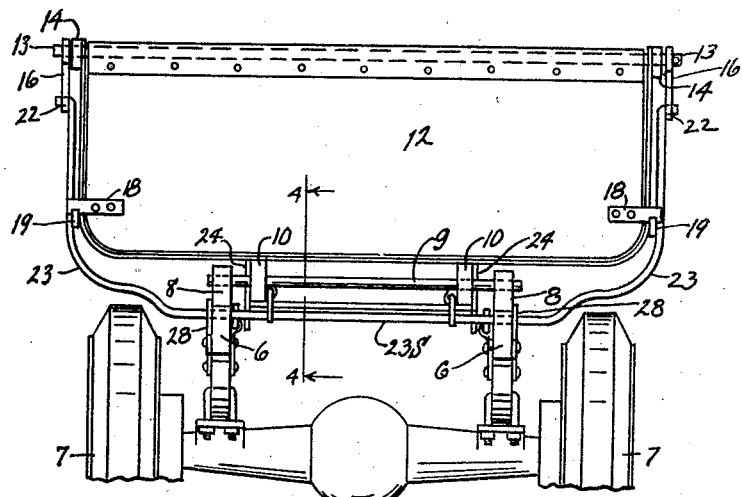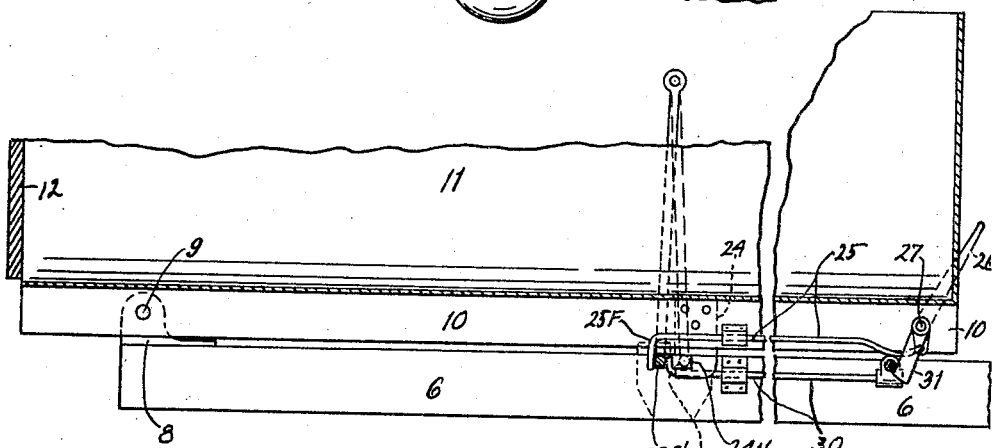

1,821,384

UNITED STATES PATENT OFFICE

ALISON B. LARSON, OF ST. PAUL, MINNESOTA

TAIL GATE DEVICE FOR DUMP TRUCKS

Application filed March 26, 1930. Serial No. 439,062.

My invention relates to devices for rapidly unloading so-called dump-trucks of any type having a dump body mounted pivotally and adapted to be unloaded by raising the dump body to an inclined position.

The main object of the invention is to provide an end gate or so-called tail-gate for dump bodies and so mounted as to be dislodged from its original position and elevated with relation to the end of the dump body, thus providing a larger discharge opening than has hitherto been possible. Other objects, advantages and the operation of my improved device are hereinafter fully set forth and illustrated, in preferred form, in the accompanying drawings, in which,—

Fig. 3 is a rear end view of Fig. 1.

Fig. 4 is a longitudinal sectional view in enlarged scale, on a vertical plane approximately centrally through the dump body and truck frame about as on line 4—4 in Fig. 3.

Figure 1:
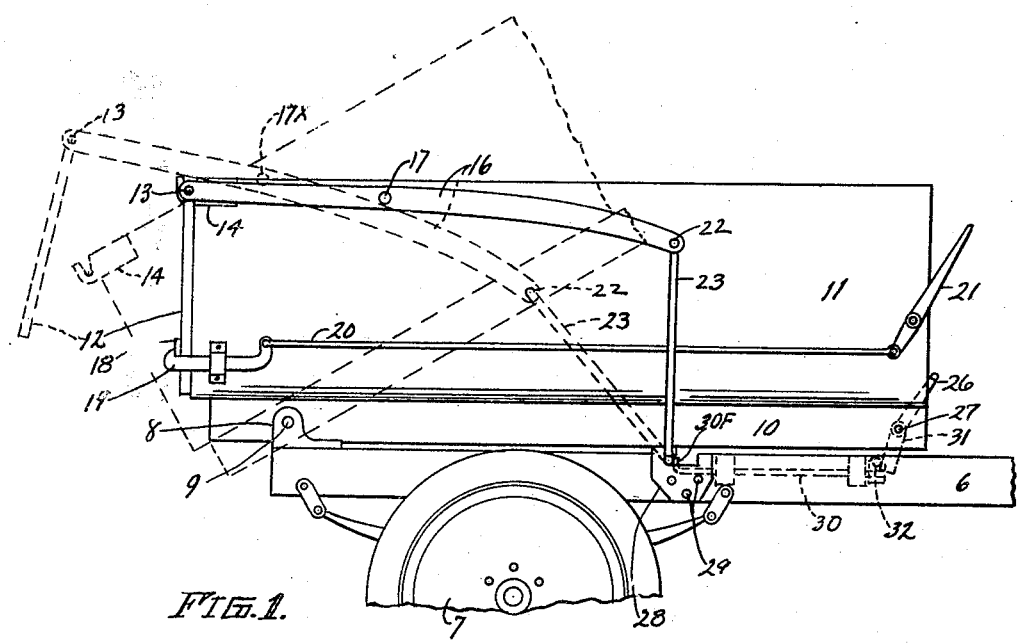
Fig. 1 is a side elevation of a motor truck rearwardly of its engine and cab, a dump body in the lowered or usual position, and my tail gate operating device in operative position. The dump body is also shown in dotted lines, in inclined position for dumping, and the tail-gate in about extreme open position.

Referring to the drawings by reference numerals, I have illustrated a truck of which 5 (Fig. 2) is the cab, 6 the parallel main frame members and 7 are the rear wheels, said frames 6 having at their rear ends the bearings 8 for a transverse rock shaft 9 on which, between members 6, is pivotally mounted the parallel stringers 10 of a dump body 11.

The dump body has an end gate 12 and the body may be lifted to any required inclined plane by suitable power means not shown, the end gate 12 provided with releasing means near its lower parts to allow it to open and dump out the material in the dump body when raised.

I have illustrated the usual type of dump body made of heavy plate metal and of U-shape in transverse section, the front end being closed by a fixed wall and the open rear end normally closed by a tail-gate 12 suspended in said open end by a hanger bar 13, the opposite ends of which are journaled in brackets 14 fixed one at each of the upper rear corners of the dump body. Hitherto, when such dump body has been raised, for dumping, the tail gate has been released to hang freely from the bar 13 and any material is dumped out under the gate as at 15 in Fig. 2.

In my device the construction is such that the tail gate may be used hanging from bar 13 in sockets 14 for ordinary dumping purposes, but for very rapid dumping certain means presently to be described raise the entire gate above its position in brackets 14 and all materials in the body readily slide out from the end, as the opening thus provided is practically unlimited (see dotted line position of the tail gate in Fig. 1). Thus the rear opening may be limited or unlimited, selectively. For example, to dump out a load of heavy and bulky material such as rocks or chunks of concrete, the tail gate is raised to highest possible position and all the material is dumped out without any danger of damage to the tail gate or its pivot bar 13.

My device comprises two counterpart beam-levers 16 arranged in approximately horizontal position, one at each side of and near the top edge of the dump body, and pivotally mounted as at 17 to said body. The rear end of each bar is bored to receive the outer end of the tail gate hanger bar 13, and with my device each bearing casting 14 has an upwardly opening groove 14G in which bar 13 normally rests while gate 13 is thus suspended in position closing the rear end of the body. 18 are side catches on the gate arranged to be held removably by a latch 19 further held by a pull rod 20 (see Fig. 1) and a lever 21. These latter details are well known in the art.

The front end of each lever 16 is bored to provide a bearing 22 for the upper end of a U-shaped bar member 23, said bar extending downwardly at both sides of the dump body, thence directed inwardly and its lower part comprising a straight section 23S, always under the stringers 10 and crossing them transversely. 24 are a pair of counterpart plates fixed one on each stringer 10, extending below the latter and having a rearwardly directed notch 24N. Both said notches receive the U-bar part 23S simultaneously, the bar being suitably retained in this position by means such as an oscillatable bar 25 extending longitudinally of one or both stringers toward the front of the truck, the rear end of such bar 25 having a downward finger 25F to engage bar 23S and draw it into the notches 24N when bar 25 is pulled forward by means such as a lever 26 pivoted on a transverse shaft 27 journaled in the stringers 10.

Figure 2:
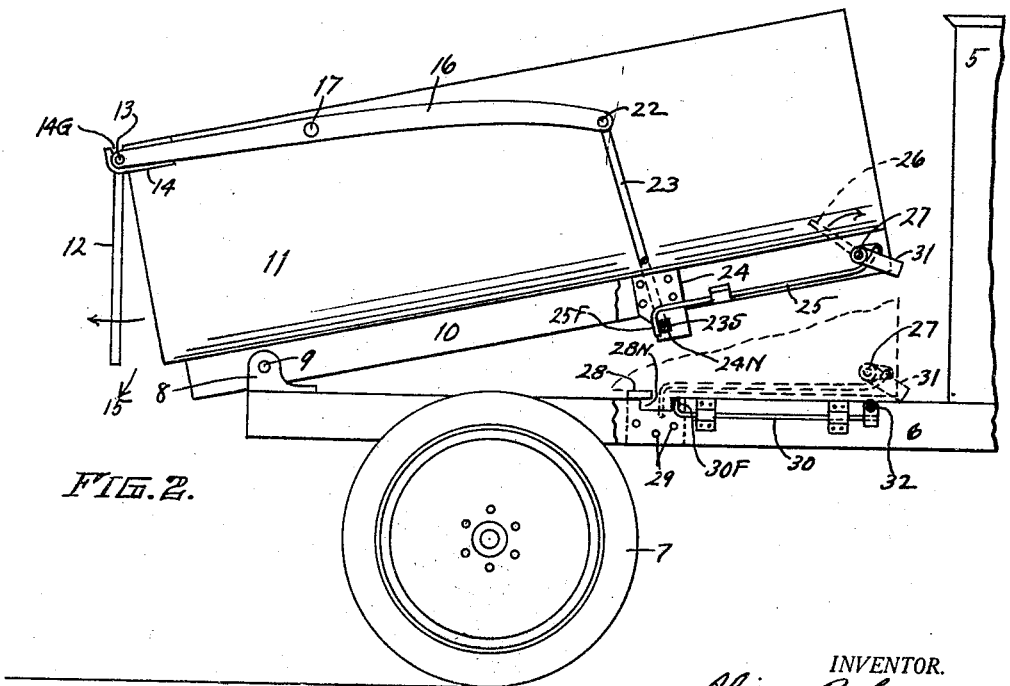
Fig. 2 is a modification of Fig. 1 showing the dump body inclined and the tail-gate swinging on its hanger bar.

Obviously, when U-bar 23 is held in notches 24N it is stationary with relation to the dump body, and if the latter is raised for dumping the hanger bar 13 of the gate remains in its sockets 14G and gate 12 will swing open with its fulcrum in the brackets 14 (see Fig. 2). This is a suitable condition when the material to be dumped is not coarse and must or can be dumped slowly.

For dumping rapidly I provide means for disengaging the U-bar 23 from the position just described and make it stationary with relation to the truck frame members 6, as follows: Assuming that the dump body is in lowered position shown in Fig. 1; 28 are a pair of upright plates fixed at 29, one on each truck frame member 6 and each having a forwardly opening notch 28N registering horizontally with the rearwardly opening notches 24N of the plates 24. To connect the U-bar part 23S rigidly but pivotally with the frame parts 6 the part 23S is moved rearwardly from position above described until it stops in the bottom of the notch 28N (see full line position of part 23S designated 23S' in Fig. 4). This is done by swinging lever 26 forward causing rod 25 to move rearward and another bar 30 mounted on frame 6 and provided with an upright finger 30F is pushed rearward simultaneously, said finger 30F bearing against part 23S and pushing it rearward. The pushing action on rod 30 is caused by a cam lever 31 pivoted on shaft 27 mounted transversely between front parts of stringers 10 as described.

Now it will be readily understood that after U-bar part 23S has been pushed rearwardly as described it is retained pivotally in the bottom parts of notches 28N and the entire U-member 23 is held stationary with relation to the truck frame. Consequently, when the dump body is then raised the member 23 is retained pivotally in the notched parts of the frame plates 28. As the dump body raises the pivots 17 of levers 16 move rearwardly as from 17 to 17X in Fig. 1, the pivotal connections 22 of members 23 and 16 are drawn downwardly with relation to pivots 17 and the rear parts of the levers 16 are raised simultaneously, with relation to the bearings 14 at the rear upper corners of the dump body. Thus the suspension bar 13 of the tail gate is raised out of the brackets 14 and the gate is suspended over the rear open end of the dump body. Obviously, the rear end of the dump body is now wide open and all material of any nature therein slides out absolutely unimpeded, the tail gate being raised bodily above the rear end of the dump body. (See Fig. 1). When all material has thus been dumped the body is lowered and the tail-gate drops back to its original position and suspended from shaft 13 which drops to resting position in the brackets 14 as shown in full lines in Fig. 1.

The sliding bar 30 above described may be provided, one at each frame member 6 and both connected by a cross bar 32 which is in the path of cam-lever 31 which pushes both rods 30 forward when said cam is swung forward by proper movement of lever 26, to push the U-bar 23 rearward for the purpose described.

The details of my device in a preferred form and its operation, have now been fully disclosed. It is obvious that a number of modifications may be embodied. For example, the U-member 23 need not necessarily be U-shaped, but made in two parts, each manipulated by the respective push and pull rods 25—30 simultaneously.

Means other than said rods 25—30 may also be used to cause pivotal connection of the U-bar 23 or corresponding parts, to either the truck frame or to the dump body sills 10 as the case may be.

I claim:

1. In a tail-gate opening device for tiltable dump truck bodies of the class described, a tail-gate pivotally suspended from a shaft and normally closing an end of the dump body when the latter is in lowered position, pivot brackets for said shaft mounted at the upper corners of the open end of the dump body, beam lever means pivotally connected with said shaft and extending forwardly therefrom, means connected with the forward parts of said beam levers and extending downwardly to the under side of the dump body, said latter means securable selectively and pivotally to the support frame means of the dump body to make the beam lever means inoperative when the dump body is elevated, or pivotally connected with a stationary object below the dump body to cause downward pull on the said beam lever when the dump body is tilted upwardly, said pivot brackets on the dump bodies provided with upwardly opening grooves for said tail-gate shaft to rest in, said beam levers fulcrumed to the side of the dump body and said means connected with the forward parts of the levers comprising a U-shaped member extending under the dump body, said U-member arranged when in fixed position relative to the dump body to hold the beam levers and the tail-gate shaft in original position with the latter in pivotal position in its brackets.

2. In a tail-gate opening device for a motor vehicle having elongated parallel main frame members, a dump body pivotally mounted on the said main frame and means for tilting said dump body; a tail-gate hingedly suspended at the end of the dump body lowered by its tilting movement, counterpart beam levers fulcrumed to said body at both sides each pivotally connected to the tail-gate at its rear end, a connecting bar extending downwardly from the front end of each beam lever, thence inwardly horizontally toward the truck frame, vertically arranged plates on the under side of the dump body and like plates fixed on the truck frame, the first plates having rearwardly directed notches and the latter plates corresponding forwardly directed notches and said notches of both sets of plates arranged in horizontal alinement when the dump body is in lowered position, and means mounted on the dump body adapted to be manipulated to move the lower horizontal parts of said connecting bars simultaneously and as required into pivotal position in the notches of the plates fixed to the dump body or the notches of the main frame members, for the purpose described.

3. The structure specified in claim 2 in which said connecting bar manipulating means comprise a fixed transverse shaft rotatably mounted in an end part of the dump body, a hand lever in accessible position thereon, a crank on said shaft and a rod mounted longitudinally of the dump truck and arranged to engage the lower connecting bar part described to pull it forward when said crank is operated in one direction by the hand lever, and a cam arm on said transverse shaft, means on the truck frame and oscillatable longitudinally thereof by movement of said cam arm to push the lower connecting bar part described rearwardly.

In testimony whereof I affix my signature.

ALISON B. LARSON.